United States Patent [19]

Shikama

[11] Patent Number: 5,264,879
[45] Date of Patent: Nov. 23, 1993

[54] PROJECTION TYPE DISPLAY APPARATUS

[75] Inventor: Shinsuke Shikama, Nagaokakyo, Japan

[73] Assignee: Mitsubishi Denki Kabushiki Kaisha, Tokyo, Japan

[21] Appl. No.: 641,790

[22] Filed: Jan. 16, 1991

[30] Foreign Application Priority Data

Jan. 22, 1990 [JP] Japan .................. 2-12835

[51] Int. Cl.⁵ .................. G03B 21/14; G03B 3/00
[52] U.S. Cl. .................. 353/31; 353/34; 353/69; 359/40
[58] Field of Search .................. 353/31, 33, 34, 37, 353/30, 69; 359/40, 41

[56] References Cited

U.S. PATENT DOCUMENTS

| | | | |
|---|---|---|---|
| 4,796,978 | 1/1989 | Tanaka et al. | 353/40 |
| 4,861,142 | 8/1989 | Tanaka et al. | 353/34 |
| 4,864,390 | 9/1989 | McKechnie et al. | 353/34 |
| 4,936,658 | 6/1990 | Tanaka et al. | 353/34 |
| 5,179,398 | 1/1993 | Iizuka | 353/30 |

FOREIGN PATENT DOCUMENTS

| | | |
|---|---|---|
| 63-15219 | 1/1988 | Japan . |
| 63-15220 | 1/1988 | Japan . |
| 2187567 | 9/1987 | United Kingdom .................. 359/41 |

Primary Examiner—William A. Cuchlinski, Jr.
Assistant Examiner—William C. Dowling

[57] ABSTRACT

A projection type display apparatus for displaying an enlarged composite image being composed of images each of which is produced upon a plurality of light valves upon a screen in every independent primary color. A correcting lens which corrects a projection magnification factor of the image formed by the light valve is disposed in the vicinity of at least one light valve on the projecting lens system side. The correcting lens adjusts the projection magnification factor of the image in each primary color to a predetermined factor. With this result, the disparity of pixels among the primary colors due to the chromatic aberration of magnification is corrected, and it becomes possible to obtain a high quality projection image.

35 Claims, 6 Drawing Sheets

PROJECTION TYPE DISPLAY APPARATUS

BACKGROUND OF THE INVENTION

1. Field of the Invention

This invention relates to a projection type display apparatus for projecting an enlarged composite image of a plurality of images formed upon respective light valves, and particularly to the performance improvement of the apparatus for projecting a composite image composed of images formed on a plurality of light valves.

2. Description of the Related Arts

FIG. 4 of the accompanying drawings is a schematic view showing a structure of an optical system of a conventional projection type display apparatus. In FIG. 4, a reference numeral 1 designates a light source; 2, a lamp; 3, a reflecting mirror; 4, a luminous flux irradiated from the light source 1; 5R, 5G, 5B, liquid crystal light valves; 15R, 15G, 15B, image forming faces of the liquid crystal light valves; 6R, 6G, 6B, condenser lenses; 7R, 7B, dichroic mirrors for color separation; 8B, 8G, dichroic mirrors for color composition; 9, 10, mirrors; 11, a projection lens system; and 12, a screen.

The operation of the conventional display apparatus will now be explained.

The luminous flux 4, having been irradiated from the white color light source lamp 2, is reflected by the reflecting mirror 3. The dichroic mirror 7R for color separation reflects a red light and allows the blue and green lights to pass through. The red light separated by the dichroic mirror 7R is then reflected by the mirror 9 and is incident on the liquid crystal light valve 5R. Meanwhile, the dichroic mirror 7B reflects a blue light, and allows a green light to pass through.

Accordingly, the blue, green and red lights are projected onto the liquid crystal light valves 5B, 5G and 5R, respectively. Upon each of the image forming faces 15G, 15B, 15R of the liquid crystal light valves 5G, 5B, 5R is formed an image of respective primary color, i.e., green, blue and red by means of non-illustrated external circuits, and the emitted luminous flux is subjected to transmission modulation inside of the light valves.

The beam emitted from the light valves 5G, 5B, 5R are incident on the projection lens system 11 as a composite luminous flux 13 by way of the dichroic mirror 8B for reflecting blue light, the dichroic mirror 8G for reflecting green light, and the reflecting mirror 10. This composite luminous flux 13 is converged into an image upon the screen 12 by means of the projection lens system 11, and an enlarged color image is finally projected for audience appreciation.

Here, the size of the liquid crystal light valves 5R, 5G, 5B are equal and disposed at the same distance from the projection lens system 11. As a result, an image of each primary color is formed in an area on the screen 12 approximately equal in size. Moreover, when a zoom lens is used as the projection lens system 11, the projection magnification factor can be varied and the size of the display area on the screen 12 can be freely changed. The condenser lenses 6R, 6G, 6B are utilized for letting the red, green, blue lights be incident on the projection lens system 11 with high efficiency.

Next, the operation and structure of the liquid crystal light valve 5 is explained with reference to FIG. 5.

The liquid crystal 20 is sandwiched between two glass plates 21 and 22, and this liquid crystal with the glass plates is further sandwiched between the polarizing plates 23 and 24. When no voltage is applied, i.e., V=0 as shown in FIG. 5a, a polarizing direction of a linearly polarized beam 4a which is transmitted through the polarizing plate 23 on the incoming side is rotated at 90 degrees by an optical rotatory power of the liquid crystal when transmitting through the liquid crystal 20. As a consequence, the linear polarized beam 4a transmits through the outgoing side polarizing plate 24, the polarization axis of which is arranged to be orthogonal to that of the incoming side polarizing plate 23. On a contrary, when the voltage, more than the threshold voltage Vth, is applied as shown in FIG. 5b, the optical rotatory power of the liquid crystal diminishes, the intensity of light passing through the outgoing side polarizing plate 24 is decreased in proportion as the increase of the voltage. By utilizing such a control action of the transmissivity and the structure of the electrodes (not shown) in two-dimensional array, image display elements can be formed in two-dimensional matrix. In the liquid crystal light valve 5 of FIG. 5, the boundary surface between the liquid crystal 20 and the outgoing side glass plate 22 constitutes the image forming face 15. The above explanation of the liquid crystal 20 is based on an example in which a TN (twisted nematic) liquid crystal having the optical rotatory angle of 90 degrees is used in normally white mode. As is widely known, although there are several modified applications other than the above example, the explanation of them is omitted here because they have no relevancy to the present invention.

A description will now refers to the projection lens system 11.

The projection lens system 11 used in the conventional projection type display apparatus consists of a combination of plural lenses, so as to obtain an optimum projection image with various types of aberrations suppressed as much as possible. However, since the wavelength of each of the three primary-colors, red, green, and blue, is distributed in a wide band range between 400 nm and 700 nm, the magnification of the projection lens system for forming an image is disadvantageously different for every primary color (chromatic aberration of magnification).

Referring to FIG. 6, the above-mentioned drawbacks in the prior art are explained hereunder. FIG. 6a shows the projection lens system 11 composed of a positive lens 11a, a negative lens 11b, and a diaphragm 11c. Assuming that the composite beam 13, composed of luminous fluxes emanated from pixels positioned at the same location in the image of respective liquid crystal light valves 5R, 5G, 5B, is incident on the projection lens system 11. In FIG. 6, for simplification, the green light is indicated as a principal ray and other lights, or blue and red lights, are treated as subordinate rays. Generally, the shorter a wavelength becomes, the higher the refractive index of a glass increases. Therefore the refractive index of the glass becomes highest in blue and lowest in red. Due to such a characteristic, as illustrated in FIG. 6a, the image produced on the screen is maximum in blue and minimum in red. FIG. 6b shows a state in which an image is formed by a pixel onto the screen 12. As described above, the image forming magnification factor becomes small in the order of blue, green and red (blue>green>red). Eventually, images of the blue pixels (a rectangular with right ascending lines) are formed outside relative to images of the green pixels (a rectangular with blank), whereas the images of the red pixels (a rectangular with right descending lines) are formed inside relative the green images. At the screen center, however, since the influence of the magnification chromatic aberration is small, the pixels of the three primary colors converge.

As seen from FIG. 6a, the above description applies to the case in which the positive lens 11a and the negative lens 11b are positioned one by one from the light valve side. If the arrangement order of the lenses is reversed, the relationship of the magnification chromatic aberration is inverted to an order of red>green>blue.

In the liquid crystal light valve, since the pixel pitch is set with high precision when manufacturing the liquid crystal plate, it is difficult to freely change the size of the display area when displaying the image. To solve this problem, a disparity (a disparity of the pixels) due to the chromatic aberration of magnification is accurately matched by adjusting the projection magnification factor of the image of the indicated primary-color by the projection optical system. As a numerical example, the size of the disparity of the three primary-colors due to the magnification chromatic aberration of the projection lens must be reduced by as little as one-tenth of one pixel. In the display of 500×500 pixels, for example, the disparity of the magnification ratio in every primary color must be suppressed approximately to a degree of $+/-1/2500$ ($+/-0.04\%$) for securing the allowable disparity at the corners of the screen. As a result, the number of lenses which are required in the projection lens system and the cost of the projection display apparatus are increased.

SUMMARY OF THE INVENTION

Therefore, an object of this invention is to obtain a projection display apparatus which is capable of adjusting the projection magnification factor, differently in each independent primary color, to be equal and correcting the disparity of the pixels in the primary colors due to the chromatic aberration of magnification of the projection lens system 11.

In accordance with one aspect, of the present invention, there is provided a projection display apparatus, comprising: correcting lens means disposed in the vicinity of a projection lens side of at least one light valve and for correcting a projection magnification factor of an image formed on an image forming face of the light valve, whereby a divergence of the image in height due to the projection lens is corrected in every primary color.

Such correction of the projection magnification ratio by means of the correcting lens acts as a preliminary adjustment of the pixel pitch of the light valve in independent light color so as to counterbalance the influence of the chromatic aberration of magnification of the projection lens.

In addition, if the chromatic aberration of magnification changes when the projection lens is zoomed, it becomes possible to prevent the color disparity of the projected pixels in any size of the projection screen by performing a fine adjustment of the position of the correcting lens in accordance with the zoom state of the projection lens.

The foregoing and other objects, features and advantages of the invention will be apparent from the following more particular description of preferred embodiments of the invention, as illustrated in the accompanying drawings wherein like numerals denote like parts throughout the drawings.

BRIEF DESCRIPTION OF THE ACCOMPANYING DRAWINGS

FIG. 1 a schematic view showing a structure of an optical system of a projection type display apparatus in accordance with a first embodiment of the present invention;

FIGS. 2(a) and 2(b) are explanatory views illustrating the operation principle of a correcting lens used in the projection type display apparatus of the present invention;

FIGS. 3(a) and 3(b) are schematic views showing a structure of a liquid crystal light valve used in a projection type display apparatus in accordance with a second preferred embodiment of the present invention;

FIG. 4 is a schematic view showing a structure of a conventional projection display apparatus;

FIGS. 5(a) and 5(b) are explanatory views illustrating the operation principle of a liquid crystal light valve; and FIGS. 6(a) and 6(b) are explanatory views illustrating the drawbacks of the conventional projection type display apparatus.

DETAILED DESCRIPTION OF THE INVENTION

Figure 1:
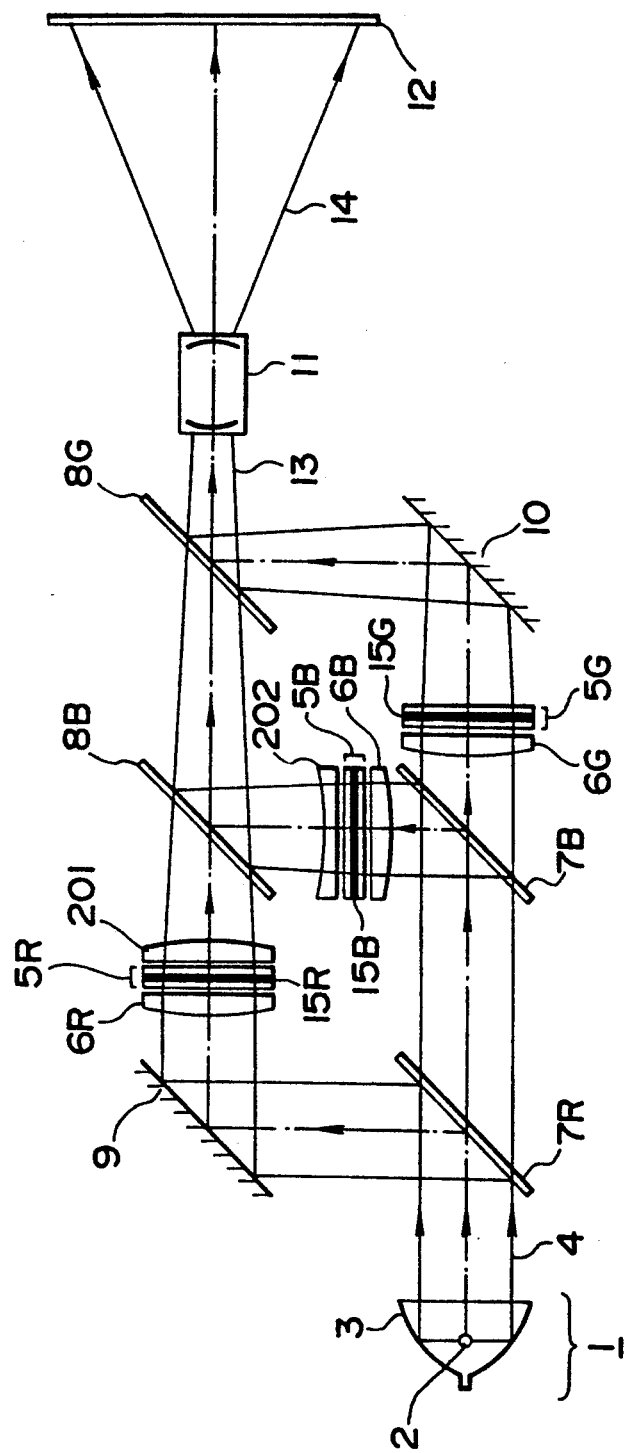
Figure 4:
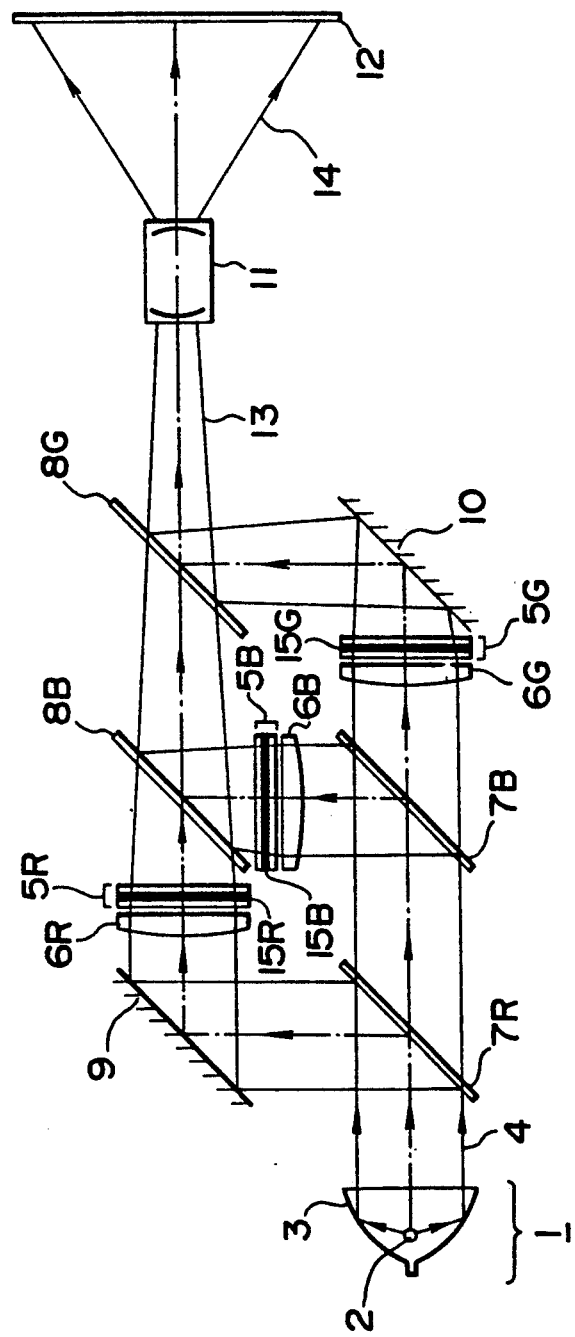
Figure 5A:
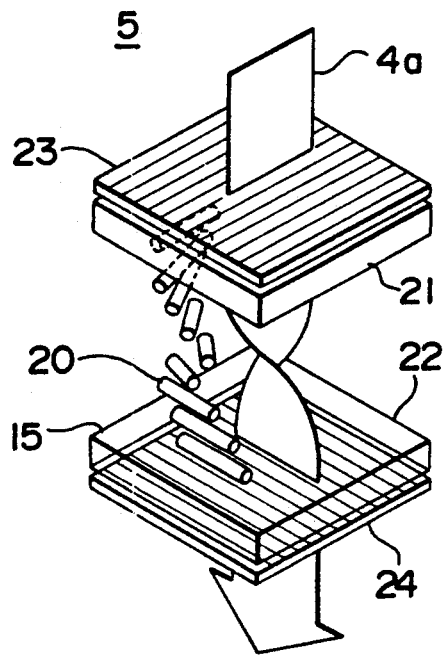
Figure 5B:
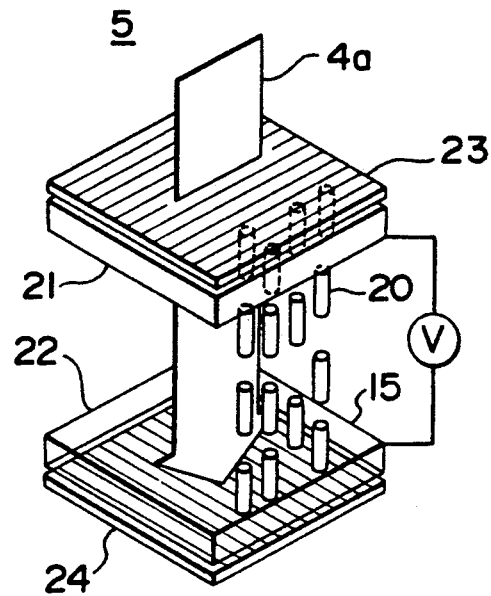

First preferred embodiment:

FIG. 1 is a schematic view showing an optical system of a projection type display apparatus in accordance with a first embodiment of the present invention. As compared with FIG. 4 showing a conventional projection display apparatus, the projection display apparatus embodying the present invention is different in that a positive correcting lens 201 is disposed behind a liquid crystal light valve 5R for red and a negative correcting lens 202 is disposed behind a liquid crystal light valve 5B for blue.

Since there is no difference between the projection display apparatus embodying the present invention and the conventional one, an explanation of the principle operation thereof will be omitted, and the function of the added correcting lenses 201, 202 will be explained with reference to FIG. 2.

Figure 2A:
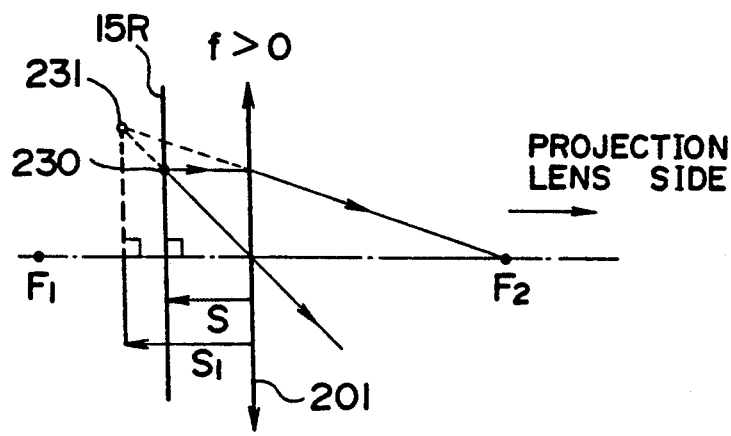

FIG. 2 is a diagram showing the operation of the positive correcting lens 201 having a focal length of f>0. The point 230, as a pixel, designates an arbitrary pixel on the image forming face 15R. F1 and F2 designate a focal point on the object side and a focal point on the image side, respectively. The optical axis of the correcting lens 201, indicated by the dash-and-one-dot lines coincides with the normal to the center of the image forming face 15R. A pixel 230 locates remote from the positive correcting lens 201 at a distance of S and an enlarged virtual image 231 is formed at a position S1. This enlarged virtual image 231 is produced by the pixel 230 positions between the focal point on the object side and the correcting lens 201, and the magnification ratio $\beta$ is given by:

$$\beta = S1/S \\ = f/(S + f) \quad (1)$$

where the signs of S1 and S are negative when they designate the distance from the lens towards the object side. It will be seen that a desired magnification factor $\beta > 1$ can be obtained by setting the distance S within the range of $-f < S < 0$.

Figure 2B:
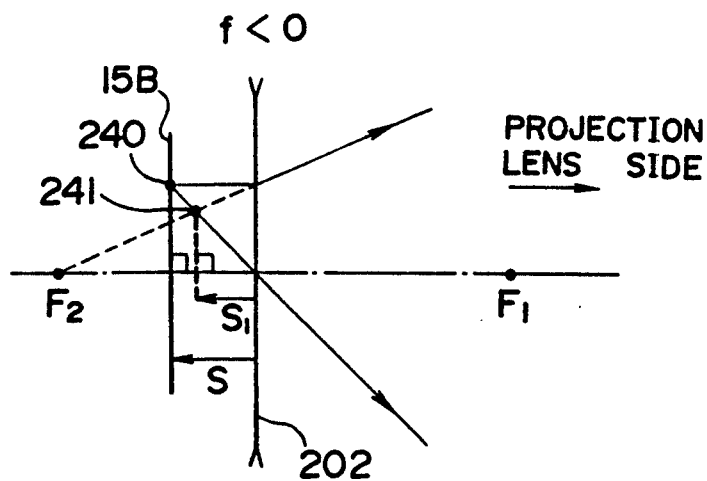

FIG. 2b shows operation of a negative correcting lens 202 having a focal length of $f < 0$. A reference numeral 240 designates an arbitrary pixel on the image forming face 15B. Moreover, the dash-and-one-dot lines indicate the optical axis of the correcting lens 202, and coincides with the normal to the center of an image forming face 15B. A reduced virtual image 241 can be formed by a pixel 240 positioned remote from the negative correcting lens 202 at the distance S. The image forming magnification factor can be expressed by equation (1) in the same manner as the positive correcting lens. It will be understood that a desired reduction ratio in the range of $0 < \beta < 1$ can be obtained by setting the distance S within $S < 0$.

Numerical Examples

Assuming that an enlarged virtual image and a reduced virtual image are produced by the difference of magnification ratio of 1% with the distance between the image forming face 15R and the correcting lens 201 and the distance between the image forming face 15B and the correcting lens 202 fixed at $S = -2$ mm, then (a) the enlarged virtual image is obtained as follows: Since $$\beta = S1/S = 1.01$$

then $$S1 = -2.02 \text{ mm}$$

and the focal length f is defined as $$f = S \cdot S1/(S - S1) \quad (2)$$

therefore, the focal length is obtained as $f = 202$ mm (focal length of the positive correcting lens 201) and, (b) the reduced virtual image is obtained as follows: Since $$\beta = S1/S = 0.99$$

then $$S1 = -1.98 \text{ mm}$$

and the focal length f is defined as $f = -198$ mm (focal length of the negative correcting lens 202) from the equation (2).

Figure 6A:
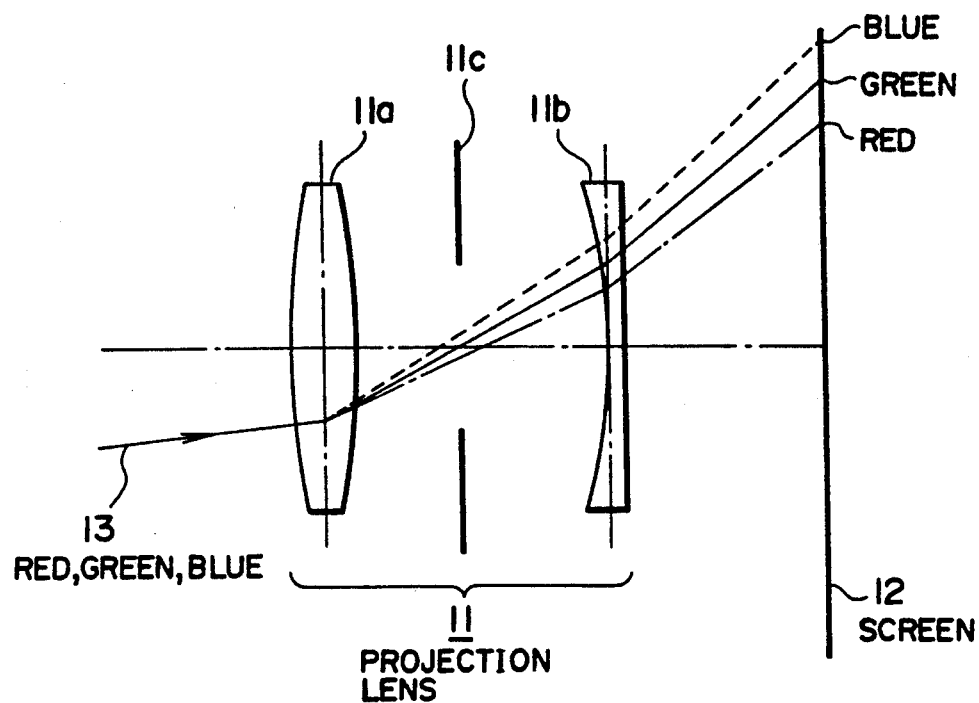
Figure 6B:
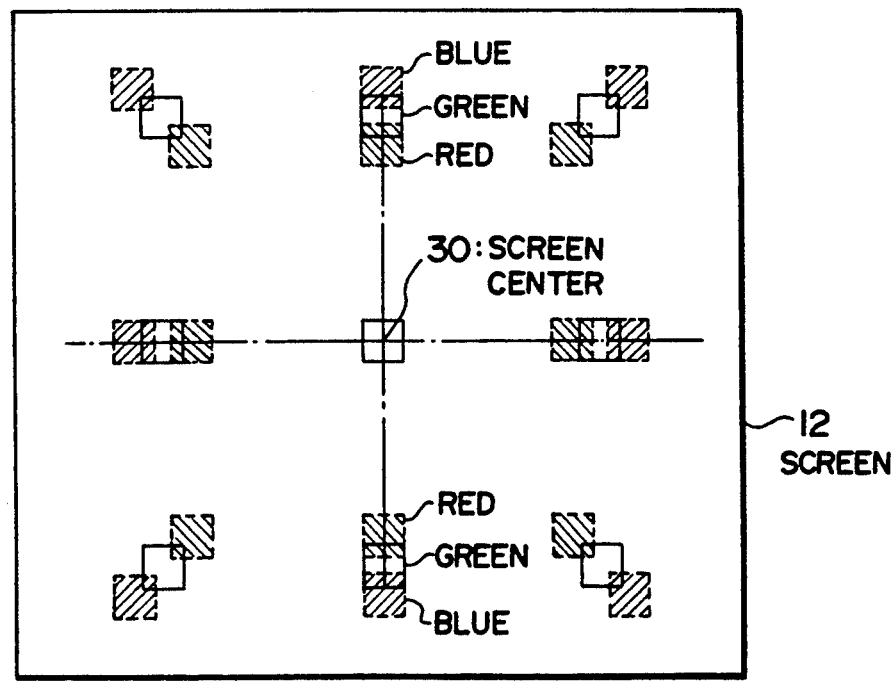

As seen from the above description and FIG. 1, the positive correcting lens 201 functions to form an image enlarged from an image produced on the image forming face 15R for red light, while the negative correcting lens 202 functions to form an image reduced from an image produced upon the image forming face 15B for blue light. Even if the chromatic aberration of magnification of the projection lens system yields a difference in the projection magnification ratio in such an order as blue > green > red as shown in FIG. 6a, it is possible to reduce the pitch of the blue pixel and to enlarge the pitch of the red pixel in appearance with respect to the reference pitch of the green pixel on the green image forming face 15G. As a result, the disparity of the pixels among the three primary-colors on the screen 12 can be eliminated.

Conversely, in the case of the magnification chromatic aberration of the projection lens arranged in a reversed order such as blue < green < red, contrary to FIG. 1, the correcting lens 201 of the red liquid crystal light valve 5R should be a negative lens, whereas the correcting lens 202 of the blue liquid crystal light valve 5B should be a positive lens.

At this time, since correcting means is provided, the image forming face shifts along the optical axis at a distance of $(S1 - S)$ in appearance, and the corrected projection image may cause a focal displacement on the surface of the screen 12.

In this case, since the virtual image is situated on a predetermined position of the image forming face by moving a pair of the liquid crystal light valve and the correcting lens by $S1 - S$ along the optical axis, the focal displacement of the projected image can be corrected. Specifically, in the case of FIG. 1, the focal displacement may be corrected simply by shifting both the liquid crystal light valve 5R and the correcting lens 201 towards the projection lens system 11 at a given distance and by shifting both the liquid crystal light valve 5B and the negative lens 202 in the opposite direction at the same distance.

Second preferred embodiment:

Referring to FIG. 3, a second embodiment of this invention will now be described hereinbelow. FIG. 3 is a schematic view showing a liquid crystal light valve used in a projection display apparatus in accordance with a second embodiment of the present invention. In this projection display apparatus, a Fresnel lens is employed as the correcting lens and is disposed inside of the liquid crystal light valve 5.

Figure 3A:
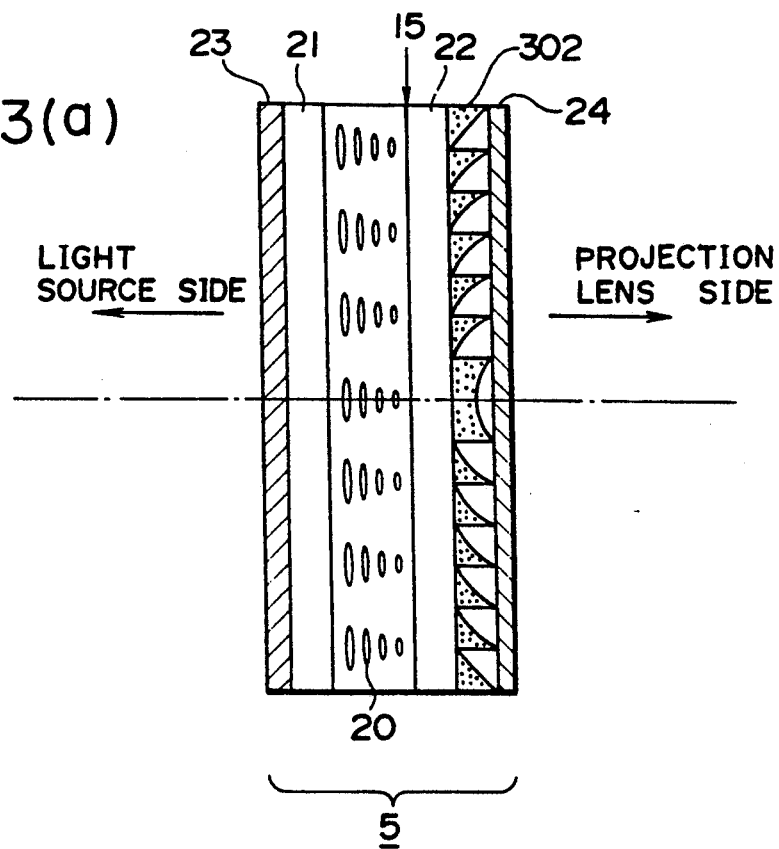

In FIG. 3a, a reference numeral 302 designates the Fresnel lens formed on the surface of a glass substrate 22 on the projection lens side and having an effect equivalent to the aforesaid negative correcting lens 202.

A numeral 15 designates an image forming face at a boundary surface between the liquid crystal 20 and the glass plate 22. Like the first embodiment, the negative Fresnel lens 302 forms an image reduced from an image on the image forming face 15.

The Fresnel lens, as widely known, is fabricated by molding resin over the surface of the glass plate 22, or molding the lens into an integrated form using the same material as of the glass plate 22.

In addition, a polarizing plate 24 will be attached to the surface of the Fresnel lens 302 by bonding or the like. With such structure, it becomes possible to fabricate the extra-thin liquid crystal light valve 5 containing the Fresnel lens 302 as a correcting lens.

Figure 3B:
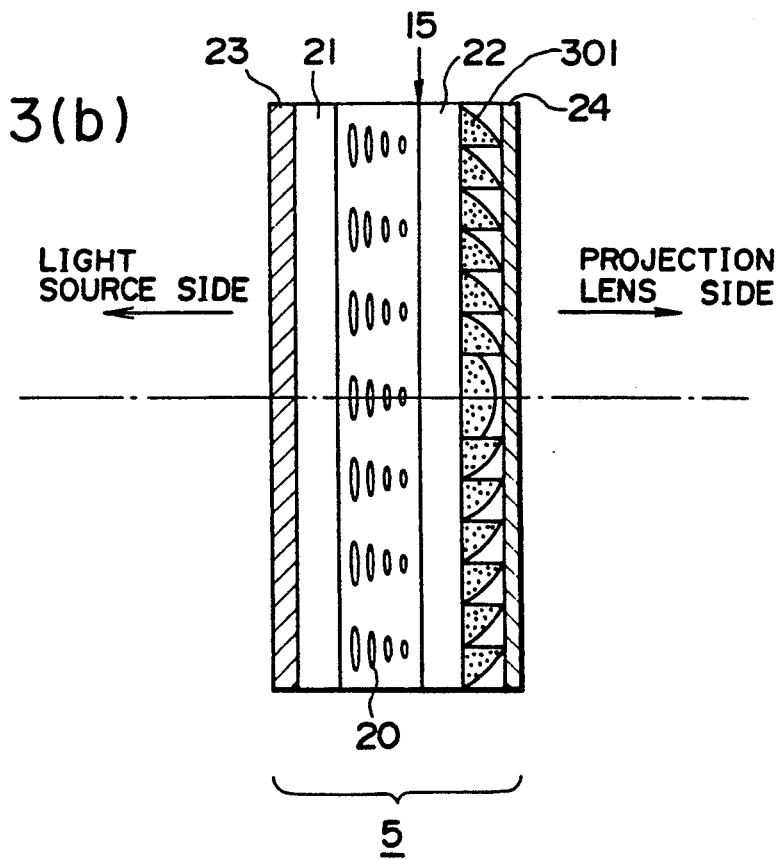

FIG. 3b shows the Fresnel lens 301 equivalent to a positive correcting lens 201. The explanation of FIG. 3b will be omitted because the structure thereof is equivalent to that of FIG. 3a except that this Fresnel lens 301 forms an enlarged virtual image on an image forming face 15. As compared to the first embodiment, the result of this invention can be obtained with an optical system simpler than that of the first embodiment by replacing the liquid crystal light valve 5 of FIG. 3a with the liquid crystal light valve 5R and a positive corrective lens 201 as well as by replacing the liquid crystal light valve 5 of FIG. 3a with the liquid crystal light valve 5B of FIG. 1 and a negative correcting lens 202.

The above-mentioned embodiments deals not with the green liquid crystal light valve 5G but with the liquid crystal light valves 5R and 5B, in which the correcting lens 201 (equivalent to the Fresnel lens 301) and the correcting lens 202 (equivalent to the Fresnel lens 302), each having a focal length of opposite sign, are disposed. Because the chromatic aberration of the projection lens system 11 for red light generally appears in opposite to that in the blue light with reference to the green light, these correcting lenses are provided for correcting the disparity of the pixels by producing an enlarged virtual image on the image forming surface of either the red liquid crystal light valve or the blue one and producing a reduced virtual image on the surface of the other liquid crystal light valve. The result of this invention can be expected by disposing the correcting lenses adjacent to or inside of all liquid crystal light valves 5R, 5G and 5B. In this case, however, the values of the magnification ratio $\beta$, the focal length f and the distance S between the pixel and the correcting lens should be determined by the equations (1) and (2) in consideration of the chromatic aberration of magnification of the projection lens system 11.

Moreover, if the size of the projecting area on the surface of the screen 12 is changed by the zoom lens instead of the projection lens system 11, the magnitude of the chromatic aberration of magnification (the rate of the projecting magnification ratio of the three primary-colors) may also change. In such a case, there will be provided a non-illustrated mechanism capable of changing the distance between the correcting lens and the pixel, as illustrated in FIG. 2 and designated by S of the equation 1, towards the optical axis in accordance with the zoomed state.

This mechanism is more effective than the aforementioned embodiments in correcting the disparity of the pixels in a desired zoomed state. Because when the correcting lenses each of which has the focal length of opposite sign, are used for the blue and red liquid crystal light valves as shown in FIG. 1, the positive correcting lens can simply produce an enlarged virtual image ($\beta > 1$) and the negative correcting lens can produce a reduced virtual image ($0 < \beta < 1$), but both of the lenses cannot cope with the polarity inversion of the chromatic aberration of magnification.

However, if the positive correcting lens is used for respective liquid crystal light valves of red, green and blue, the enlargement ratio of each correcting lens can be independently varied in the range of $\beta > 1$, and it becomes possible to correct the disparity of the pixels in each color even if the polarity inversion of the chromatic aberration of magnification of the projection lens occurs.

Likewise, if the negative correcting lens is used in respective liquid crystal light valves of red, green and blue, the reduction ratio of each correcting lens can be independently varied within the range of $0 < \beta < 1$, it becomes possible to correct the disparity of the pixels in each primary color even if the polarity inversion of the magnification chromatic aberration of the projection lens occurs.

Although the liquid crystal is used as the light valve in the above-described embodiments, as an alternative technique, it is also well known that an oil film is used as the light valve. In practice, the present invention can be effective when applied to a projection display apparatus having any type of light valves if the apparatus is the projection display apparatus which is capable of composing an image from images of respective light colors formed on a plurality of light valves and display the composite image. Moreover, the number of the light valves are never restricted to three, it may be possible to apply the present invention to the display having two light valves or having not less than three light valves.

In each of the above embodiments, the description relates to the optical system for decomposing the luminous fluxes radiated from the white light source into color lights by the dichroic mirror and illuminating each liquid crystal light valve.

Another well-known technique is that a color light for illuminating each liquid crystal light valve is independently obtained from a luminous flux radiated from a separate lamp, and it is a matter of course that the correction method of this invention, that is, the correction of the disparity of the pixels by means of the correcting lens can be applied to an optical system which is similar to the embodiment set forth.

Further, although a transmitting type light valve is used in each of the embodiments of the present invention, a projection display apparatus using a reflecting light valve is also a widely-known apparatus. It goes without saying that correction of the chromatic aberration of magnification by the correcting lens embodying the present invention can be used in such an apparatus equipped with the reflective liquid crystal light valves without yielding any disadvantage.

As has been fully described, because the correcting lens for forming an enlarged or a reduced virtual image of the image on the image forming face is provided to at least one of the respective light valves of the three primary-colors and projects an enlarged virtual image or the reduced virtual image through the projection lens system, the chromatic aberration of magnification of the projection lens can be corrected in every primary color, thereby realizing the projection display apparatus which is free of the disparity of the pixels among the primary colors. Furthermore, since it is possible to use the projection lens system composed of the less number of lenses, the production cost of the projection display apparatus can be reduced.

Still another advantage is that it becomes possible to provide a projection display apparatus which can prevent the pixel disparity due to alteration of the screen size by changing the position of the correcting lens or changing the position of the light valve along the optical axis in accordance with the zoom state.

What is claimed is:

1. A projection type display apparatus, comprising:
 a plurality of light valves each of which forms an image onto an image forming face;
 at least one light source means for radiating a color beam independently to each of said plurality of light valves;
 a projection lens system for producing an enlarged image composed of the images respectively formed on said image forming faces of said plurality of light valves; and
 (a) correcting lens means disposed on a projection lens side of at least two of said plurality of light valves for correcting a projection magnification factor of the image formed on said image forming face of said at least two light valves, including negative correction lens means and positive correction lens means, thereby correcting the divergence of the projected image of each primary color due to said projection lens system.

2. The projection type display apparatus of claim 1, wherein said projection magnification factor of said correcting lens means is adjusted in accordance with a chromatic aberration of magnification of said projection lens system.

3. The projection type display apparatus of claim 1, wherein said plurality of light valves are located against said correcting lens means at optimum positions of the optical axis such that virtual images of said image forming face of said plurality of light valves are formed at correct positions and with correct sizes so as to correct said projection magnification factor by means of said correcting lens means.

4. The projection type display apparatus of claim 1, wherein said positive correcting lens means has a positive focal length polarity and said negative correcting lens means has a negative focal length polarity.

5. The projection type display apparatus of claim 1, wherein said plurality of light valves are liquid crystal type light valves.

6. The projection type display apparatus of claim 1, wherein said plurality of light valves include an oil film.

7. The projection type display apparatus of claim 1, wherein said plurality of light valves are transmission type devices.

8. The projection type display apparatus of claim 1, wherein said plurality of light valves are reflecting type devices.

9. The projection type display apparatus of claim 1, said projection lens system further including a zoom lens wherein a position of said correcting lens means is shifted along an optical axis of said apparatus in accordance with a zoom ratio of said zoom lens.

10. The projection type display apparatus of claim 9, wherein a position of said plurality of light valves is shifted along the optical axis in accordance with the zoom ratio of said zoom lens.

11. The projection type display apparatus of claim 1, wherein said correcting lens means includes a Fresnel lens.

12. The projection type display apparatus of claim 11, wherein said Fresnel lens is molded onto the surface of said plurality of light valves and incorporated into said plurality of light valves.

13. A projection type display apparatus, comprising:
projection lens means for projecting a color image on a screen including a positive lens and a negative lens, said negative lens positioned on a projection side of said positive lens; and
correcting lens means for correcting chromatic aberrations in the projected color image, including,
positive correction lens means, positioned on a projection side of a first light valve, said first light valve emitting a color component of the projected color image with the longest wavelength for enlarging an image of the color component with the longest wavelength, and
negative correction lens means, positioned on a projection side of a second light valve, said second light valve emitting a color component of the projected color image with a shortest wavelength for reducing an image of the color component with the shortest wavelength.

14. The projection type display apparatus of claim 13, said projection lens means further including a zoom lens, wherein a position of said correcting lens means is shifted along an optical axis of said apparatus in accordance with a zoom ratio of said zoom lens.

15. The projection type display apparatus of claim 13, wherein said plurality of light valves are liquid crystal type light valves.

16. The projection type display apparatus of claim 13, wherein said plurality of light valves include an oil film.

17. The projection type display apparatus of claim 13, wherein said plurality of light valves are transmission type devices.

18. The projection type display apparatus of claim 13, wherein said plurality of light valves are reflecting type devices.

19. The projection type display apparatus of claim 13, wherein said correcting lens means includes a Fresnel lens.

20. The projection type display apparatus of claim 19, wherein said Fresnel lens is molded onto the surface of said plurality of light valves and incorporated into said plurality of light valves.

21. The projection type display apparatus of claim 14, wherein said correcting lens means includes a Fresnel lens.

22. The projection type display apparatus of claim 21, wherein said Fresnel lens is molded onto the surface of said plurality of light valves and incorporated into said plurality of light valves.

23. The projection type display apparatus of claim 14, said apparatus further comprising shifting means for shifting said first and second light valves along an optical axis of said apparatus a distance dependent on the zoom ratio of said zoom lens.

24. A projection type display apparatus, comprising:
projection lens means for projecting a color image on a screen including a positive lens and a negative lens, said positive lens positioned on a projection side of said negative lens; and
correcting lens means for correcting chromatic aberrations in the projected color image, including,
positive correction lens means positioned on a projection side of a first light valve, said first light valve emitting a color component of the projected color image with the shortest wavelength, for enlarging an image of the color component with a shortest wavelength, and
negative correction lens means, positioned on a projection side of a second light valve, said second light valve emitting a color component of the projected color image with a longest wavelength for reducing an image of the color component with the longest wavelength.

25. The projection type display apparatus of claim 24, said projection lens means further including a zoom lens, wherein a position of said correcting lens means is shifted along an optical axis of said apparatus in accordance with a zoom ratio of said zoom lens.

26. The projection type display apparatus of claim 24, wherein said plurality of light valves are liquid crystal type light valves.

27. The projection type display apparatus of claim 24, wherein said plurality of light valves include an oil film.

28. The projection type display apparatus of claim 24, wherein said plurality of light valves are transmission type devices.

29. The projection type display apparatus of claim 24, wherein said plurality of light valves are reflecting type devices.

30. The projection type display apparatus of claim 24, wherein said correcting lens means includes a Fresnel lens.

31. The projection type display apparatus of claim 30, wherein said Fresnel lens is molded onto the surface of said plurality of light valves and incorporated into said plurality of light valves.

32. The projection type display apparatus of claim 25, wherein said correcting lens means includes a Fresnel lens.

33. The projection type display apparatus of claim 32, wherein said Fresnel lens is molded onto the surface of said plurality of light valves and incorporated into said plurality of light valves.

34. The projection type display apparatus of claim 25, said apparatus further comprising shifting means for shifting said first and second light valves along an optical axis of said apparatus a distance dependent on the zoom ratio of said zoom lens.

35. A projection type display apparatus, comprising:
- a plurality of light valves each of which forms an image onto an image forming face;
- at least one light source means for radiating a color beam independently to each of said plurality of light valves;
- a zoom projection lens system for producing an enlarged image composed of the images respectively formed on said image forming faces of said plurality of light valves and for changing a zoom of the enlarged image according to a zoomed state of said zoom projection lens system; and
- correcting lens means disposed on a zoom projection lens side of at least two of said plurality of light valves for correcting a projection magnification factor of the image formed on said image forming face of said at least two light valves;
- wherein a sign of a focal length of said correcting lens means has a single focal length polarity; and
- means for changing a distance between said correcting lens means and said plurality of light valves according to the zoomed state of said zoom projection lens system.

* * * * *